United States Patent
Hiraya et al.

(10) Patent No.: US 6,739,309 B2
(45) Date of Patent: May 25, 2004

(54) DIRECT FUEL INJECTION INTERNAL COMBUSTION ENGINE

(75) Inventors: Koji Hiraya, Yokohama (JP); Akihiko Kakuho, Yokosuka (JP); Tomonori Urushihara, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/421,874

(22) Filed: Apr. 24, 2003

(65) Prior Publication Data

US 2003/0221658 A1 Dec. 4, 2003

(30) Foreign Application Priority Data

Jun. 4, 2002 (JP) .......................... 2002-162358
Jul. 4, 2002 (JP) .......................... 2002-195608

(51) Int. Cl.[7] ................................. F02F 3/26
(52) U.S. Cl. ........................ 123/279; 123/285
(58) Field of Search ................ 123/279, 285, 123/256, 288, 253

(56) References Cited

U.S. PATENT DOCUMENTS 3,872,841 A * 3/1975 Kimbara et al. ............ 123/279

6,453,872 B1   9/2002 Miyajima et al.

FOREIGN PATENT DOCUMENTS

| JP | 2000-265841 A | 9/2000 |
| JP | 2000-303936 A | 10/2000 |
| JP | 2000-329036 A | 11/2000 |

* cited by examiner

*Primary Examiner*—Bibhu Mohanty
(74) *Attorney, Agent, or Firm*—Shinjyu Global IP Counselors, LLP.

(57) ABSTRACT

A direct fuel injection internal combustion engine comprises a combustion chamber, a fuel injection valve and a spark plug. The combustion chamber has a piston including an outer cavity located in a top surface of the piston and an inner cavity located in the outer cavity. The outer and inner cavities are substantially axially symmetrical about the reciprocation axis of the piston. The fuel injection valve is arranged adjacent the reciprocation axis of the piston to inject a fuel stream directly into the combustion chamber. The spark plug is arranged adjacent the reciprocation axis of the piston to ignite a fuel-air mixture inside the combustion chamber. The direct fuel injection internal combustion engine further comprises a control unit configured to vary at least one of frequency and start timings of the fuel injection valve based on an engine operating condition.

35 Claims, 10 Drawing Sheets

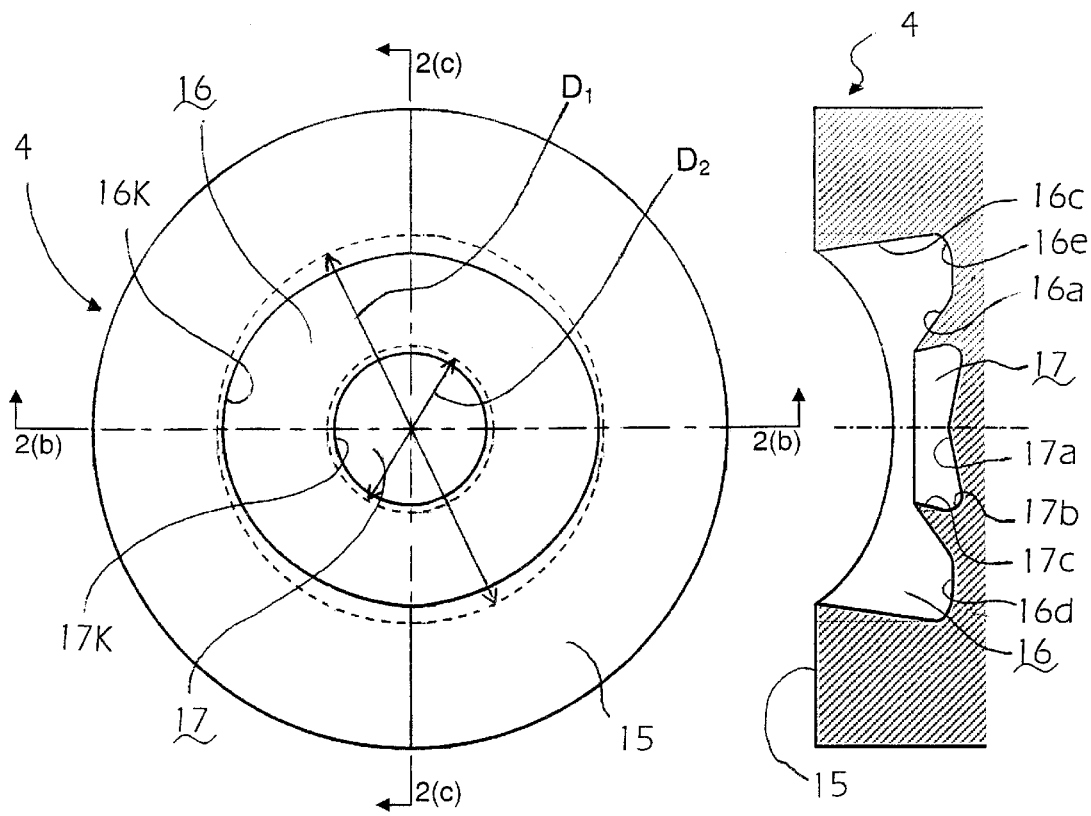
Fig. 2(a)
Fig. 2(c)
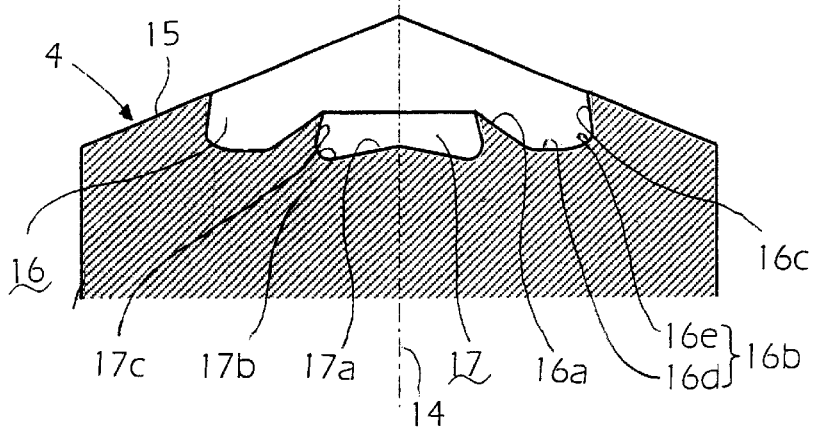
Fig. 2(b)

FUEL-AIR MIXTURE
AGGLOMERATION
RESULTING FROM
FIRST FUEL INJECTION

FUEL-AIR MIXTURE
AGGLOMERATION
RESULTING FROM
FIRST FUEL INJECTION

FUEL-AIR MIXTURE
AGGLOMERATION
RESULTING FROM
SECOND FUEL INJECTION

FUEL-AIR MIXTURE
AGGLOMERATION
RESULTING FROM
FIRST FUEL INJECTION

FUEL-AIR MIXTURE
AGGLOMERATION
RESULTING FROM
SECOND FUEL INJECTION

DIRECT FUEL INJECTION INTERNAL COMBUSTION ENGINE

BACKGROUND OF THE INVENTION

1. Field of the Invention

The present invention generally relates to a direct fuel injection internal combustion engine that employs a center injection arrangement in which a fuel injection valve and a spark plug are arranged on or near a reciprocation axis of the piston. More specifically, the present invention relates to an improvement to the shapes of cavities located in a top surface of the piston and to the control of frequency and timing of the fuel injection.

2. Background Information

An example of a direct fuel injection internal combustion engine that employs a center injection arrangement in which a fuel injection valve and spark plug are arranged on or near the reciprocation axis of the piston is disclosed in Japanese Laid-Open Patent Publication No. 2000-265841. In this publication, the top surface of the piston is provided with a deep dish part (an inner cavity) that is substantially axially symmetrical with respect to the reciprocation axis of the piston and a plurality of shallow dish parts (outer cavities) that are arranged discontinuously around the perimeter of the deep dish part. The shallow dish parts constitute a valve recess shape to avoid interfering with intake and exhaust valves and are not axially symmetrical with respect to the reciprocation axis of the piston. In this publication, the shape of a fuel stream injected from an injector is that of a hollow cone. When operating in a region of low to medium speed, the fuel injection timing is controlled to occur during a latter half of the compression stroke such that the fuel stream hits the deep dish part. When the fuel stream hits the deep dish part, a high stratified state is obtained in which an agglomerate fuel-air mixture forms inside the deep dish part and thereabove. When operating in a region of high speed, the fuel injection timing is controlled to occur during a former half of the compression stroke such that the fuel stream hits the shallow dish parts. When the fuel stream hits the shallow dish parts, the fuel stream is guided by lateral wall surfaces of the shallow dish parts such that it swirls upward. As a result, a low stratified state is obtained in which a fuel-air mixture agglomeration is formed inside the shallow dish parts and thereabove.

In view of the above, it will be apparent to those skilled in the art from this disclosure that there exists a need for an improved direct fuel injection internal combustion engine. This invention addresses this need in the art as well as other needs, which will become apparent to those skilled in the art from this disclosure.

SUMMARY OF THE INVENTION

It has been discovered that, in the direct fuel injection internal combustion engine of the prior art explained above, the fuel stream injected into the shallow dish parts spills into the spaces between the shallow dish parts. This spillage of the fuel stream creates the risk of degraded fuel efficiency and increased unburned hydrocarbons when the shallow dish parts are used to conduct stratified charge combustion. On the other hand, when the deep dish part is used to conduct stratified charge combustion, the fuel stream injected at the deep dish part easily spills into the shallow dish parts because the side wall of the deep dish part joins with the shallow dish parts in gradual slopes. Thus, when the deep dish part is used to conduct the stratified charge combustion, degraded fuel efficiency and increased unburned hydrocarbons are also a concern. Moreover, depending on the diameter of the shallow dish parts and the shape of the lateral wall surfaces of the shallow dish parts, the fuel-air mixture agglomeration may be formed in the shape of a donut and cause the stability of the spark plug ignition to be reduced. The upward-swirling fuel stream can be made to gather in the center of the combustion chamber by slanting the lateral wall surfaces inward (into a reentrant shape). However, the more the lateral wall surfaces are slanted, the poorer the S/V ratio of the combustion chamber becomes and the more the output and fuel efficiency performance are degraded. Furthermore, the act of gathering the upper part of the fuel-air mixture in the center of the combustion chamber is contrary to the original objective of obtaining a low stratified charge state.

The forgoing object of the present invention can basically be attained by providing a direct fuel injection internal combustion engine comprising a combustion chamber, a fuel injection valve and a spark plug. The combustion chamber has a piston movably mounted therein along a reciprocation axis. The fuel injection valve is arranged adjacent the reciprocation axis of the piston to inject a fuel stream directly into the combustion chamber. The spark plug is arranged adjacent the reciprocation axis of the piston to ignite a fuel-air mixture inside the combustion chamber. The piston includes an outer cavity located in a top surface of the piston and being substantially axially symmetrical about the reciprocation axis of the piston. The piston also includes an inner cavity located in the outer cavity and being substantially axially symmetrical about the reciprocation axis of the piston.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2(*a*) is a top plan view of a piston adapted to the direct fuel injection internal combustion engine illustrated in FIG. 1 in accordance with the first embodiment of the present invention;

FIG. 2(*b*) is a partial cross sectional view of the piston illustrated in FIG. 2(*a*) taken along a section line 2(*b*)—2(*b*) in FIG. 2(*a*) in accordance with the first embodiment of the present invention;

FIG. 2(*c*) is a partial cross sectional view of the piston illustrated in FIG. 2(*a*) taken along a section line 2(*c*)—2(*c*) in FIG. 2(*a*) in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
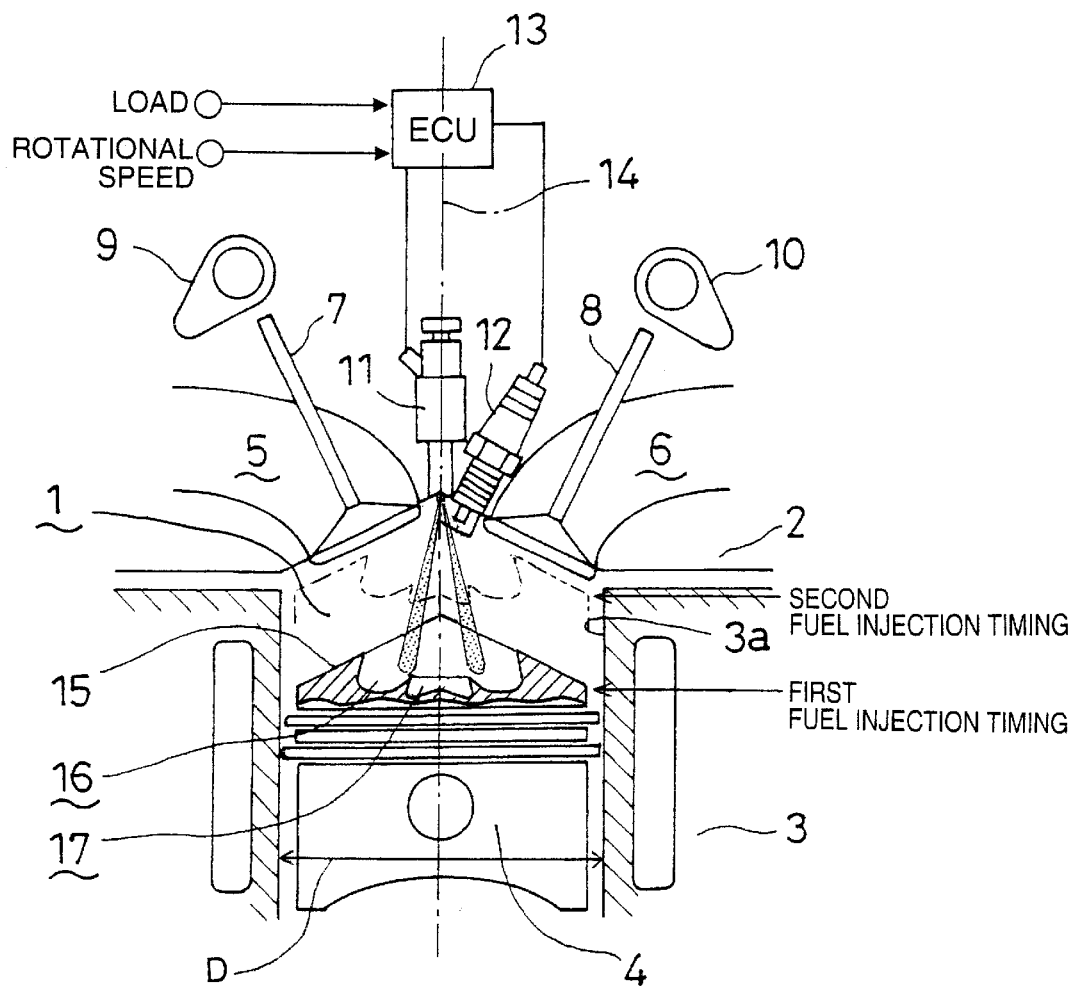
FIG. 1 is a diagrammatic view of a direct fuel injection internal combustion engine in accordance with a first embodiment of the present invention.

Referring initially to FIG. 1, a direct fuel injection internal combustion engine is illustrated in accordance with a first embodiment of the present invention. Basically, the direct fuel injection internal combustion engine in accordance with the first embodiment of the present invention includes a combustion chamber 1, a fuel injection valve 11, a spark plug 12 and a piston 4 with an outer cavity 16 and an inner cavity 17. The outer cavity 16 and the inner cavity 17 are arranged to be substantially rotationally symmetrical (axially symmetrical or toroidal) with respect to a reciprocation axis 14 of the piston 4. As used herein, the phrase "substantially axially symmetrical" should be interpreted to include minor variations in the surface that do not alter the objectives of the present invention. Thus, the phrase "substantially axially symmetrical" includes a slightly flattened circle, or shapes in which a portion of the surface has been removed. When a stratified charge combustion is conducted in the direct fuel injection internal combustion engine of the present invention, either the outer cavity 16 or the inner cavity 17 is used appropriately to form a fuel-air mixture in the vicinity of the spark plug 12 depending on an engine operating condition. As a result, good fuel efficiency can be obtained and the exhaust of unburned hydrocarbons can be sufficiently suppressed. Moreover, in the present invention, by controlling at least one of frequency and start timings of fuel injection during a cycle, a relatively large stratified fuel-air mixture agglomeration can be obtained when the engine operating conditions are within a prescribed operating region. Thus, the occurrence of a lean fuel-air mixture region in the center of the fuel-air mixture agglomeration (i.e., a donut-shaped fuel-air mixture agglomeration) can be avoided.

As used herein, the stratified charge combustion is a type of combustion in which a relatively small amount of fuel is injected during a compression stroke to form a fuel-air mixture agglomeration in the vicinity of the spark plug. Since the fuel-air mixture is formed only in the vicinity of the spark plug with the surrounding area in the combustion chamber being occupied by air, stable combustion is accomplished even with the relatively small amount of fuel. On the other hand, the homogeneous charge combustion is a type of combustion in which the fuel is injected during an intake stroke, and thus, a homogeneous fuel-air mixture is formed throughout the combustion chamber. Since the air and the fuel are mixed thoroughly before the combustion occurs, high power output can be obtained in the homogeneous charge combustion.

As seen in FIG. 1, the combustion chamber 1 is basically defined by a cylinder head 2, a cylinder block 3 and the piston 4. The fuel injection valve 11 and the spark plug 12 are mounted in the cylinder head 2. The piston 4 has a top surface 15 that includes the outer cavity 16 and the inner cavity 17. The piston 4 has piston rings that slideably engage an internal surface 3a of the cylinder block 3. The cylinder head 2 includes at lease one intake port 5 and at least one exhaust port 6 that open into the combustion chamber 1. The intake port 5 and the exhaust port 6 are opened and closed by an intake valve 7 and an exhaust valve 8, which are driven using an intake cam 9 and an exhaust cam 10, respectively. The fuel injection valve 11 injects fuel directly into the combustion chamber 1 toward the top surface 15 of the piston 4. The spark plug 12 ignites a fuel-air mixture inside the combustion chamber 1.

The fuel injection valve 11 and the spark plug 12 are arranged in the cylinder head 2 such that they face the top surface 15 of the piston 4. The fuel injection valve 11 and the spark plug 12 are preferably in close proximity to each other. In this first embodiment, the fuel injection valve 11 and the spark plug 12 are preferably arranged to lie on or near the reciprocation axis 14 of the piston 4 which is substantially identical to a center axis of the cylinder. More specifically, the fuel injection valve 11 is preferably arranged on the reciprocation axis 14 of the piston 4 such that the fuel is injected symmetrically around the reciprocation axis 14, and the spark plug 12 is arranged in close proximity to the fuel injection valve 11 such that the spark from the spark plug 12 occurs substantially adjacent the reciprocation axis 14.

As used herein, a reciprocation axis of the piston can be any axis taken at one point on the piston that is parallel to a direction of the reciprocation movement of the piston. Thus, it will be apparent to those skilled in the art from this disclosure that the reciprocation axis 14 of the piston 4 and the center axis of the cylinder can be apart from each other as long as the fuel injection valve 11 and the spark plug 12 are arranged to lie on or near the reciprocation axis 14 of the piston 4. Moreover, while the reciprocation axis 14 and the center axes of the cavities 16 and 17 are illustrated as being located along the center longitudinal axis of the piston 4, it will be apparent to those skilled in the art from this disclosure that the reciprocation axis 14 and the center axes of the cavities 16 and 17 can be offset from the center longitudinal axis of the piston 4.

The fuel injection valve 11 and the spark plug 12 are operatively coupled to an engine control unit 13 such that the operations of the fuel injection valve 11 and the spark plug 12 are controlled by the engine control unit 13. The engine control unit 13 preferably includes a microcomputer with a direct fuel injection control program that controls at least one of frequency and start timing of fuel injection based on an engine operating condition as discussed in more detail below. More specifically, the engine control unit 13 is configured to receive signals indicative of at least an engine load and the rotational speed to determine the engine operating condition. The engine control unit 13 can also include other conventional components such as an input interface circuit, an output interface circuit, and storage devices such as a ROM (Read Only Memory) device and a RAM (Random Access Memory) device. The internal RAM of the engine control unit 13 stores statuses of operational flags and various control data. It will be apparent to those skilled in the art from this disclosure that the precise structure and algorithms for the engine control unit 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. The engine control unit 13 is a conventional component that is well known in the art. Since engine control units are well known in the art, the particulars of the engine control unit 13 will not be discussed or illustrated in detail herein.

As seen in FIGS. 2(a)–2(c), the top surface 15 of the piston 14 preferably extends in an upward direction in a substantially pentroof shape that matches the shape of the top surface of the combustion chamber 1 having a substantially pentroof shape formed in the cylinder head 2. Moreover, the piston 4 includes the outer cavity 16 located in the top surface 15 of the piston and the inner cavity 17 located within the outer cavity 16. More specifically, the outer cavity 16 is located in a center portion of the top surface 15 of the piston 4 as though the center portion of the top surface 15 has been cut away. The outer cavity 16 is substantially axially symmetrical about the reciprocation axis 14 of the piston 4. Also, the inner cavity 17 is substantially axially symmetrical about the reciprocation axis 14 of the piston 4. In other words, the outer cavity 16 and the inner cavity 17 are formed concentrically in the top surface 15 of the piston 4 so as to obtain a double cavity structure. With this double cavity structure, the inner cavity 17 is utilized to accomplish the stratified charge combustion when the injection timing is advanced for example when the engine is operating in low load regions. The outer cavity 16 is utilized to accomplish the stratified charge combustion when the fuel injection timing is retarded for example when the engine is operating in high load regions. As a result, the stratified charge combustion that is stable, fuel efficient, and produces few unburned hydrocarbons can be achieved in a wide range of load regions, including low load and high load regions.

As described above, the outer cavity 16 is substantially rotationally symmetrical (axially symmetrical or toroidal) with respect to the reciprocation axis 14 of the piston 4. However, the top surface 15 of the piston 4 in which the outer cavity 16 is formed has a substantially pentroof shape, and thus, is not rotationally symmetrical. Consequently, as shown in FIG. 2(a), an opening part 16k of the outer cavity 16 does not have a shape of a perfect circle centered on the reciprocation axis 14 of the piston 4 in a top plan view (i.e., viewed downwardly from the direction of the fuel injection valve 11). On the other hand, the inner cavity 17, which is located in the outer cavity 16, is rotationally symmetrical (axially symmetrical or toroidal) with respect to the reciprocation axis 14 of the piston 4. Therefore, an opening part 17k of the inner cavity 17 has a shape of a perfect circle centered on the reciprocation axis 14 of the piston 4 in a top plan view (i.e., viewed downwardly from the direction of the fuel injection valve 11).

Of course, it will be apparent to those skilled in the art from this disclosure that the precise shape of the top surface 15 of the piston 4 can be varied depending upon the various dimensional relationships, constructions of the parts (e.g., the combustion chamber 1, the piston 4, the valves 7 and 8, the fuel injection valve 11 and the spark plug 12) of the fuel injection engine, and other considerations. For example, the top surface 15 can be a flat surface that is substantially parallel to an orthogonal plane of the reciprocation axis 14 of the piston 4, or a combination of a flat surface and a slanted surface such that the top surface 15 of the piston 4 is a circular cone that extends upwardly with respect to the piston 4 and cut horizontally in one plane, i.e., frustoconical.

The inner cavity 17 and the outer cavity 16 are arranged such that a maximum diameter $D_2$ of the inner cavity 17, a maximum diameter $D_1$ of the outer cavity 16, and a bore diameter D of the inner surface 3a have the following relationships: $D_2<(\tfrac{1}{2})D$ and $(\tfrac{1}{2})D \leq D_1 \leq (\tfrac{3}{4})D$. As a result, when the engine is operating within a region ranging from extremely low (idling) to low, an excellent stratified fuel-air mixture agglomeration can be formed using only the inner cavity 17. On the other hand, when the engine is operating within a region ranging from medium to high, an excellent stratified fuel-air mixture agglomeration can be formed using both the outer cavity 16 and the inner cavity 17 as explained in more detail below.

Figure 3:
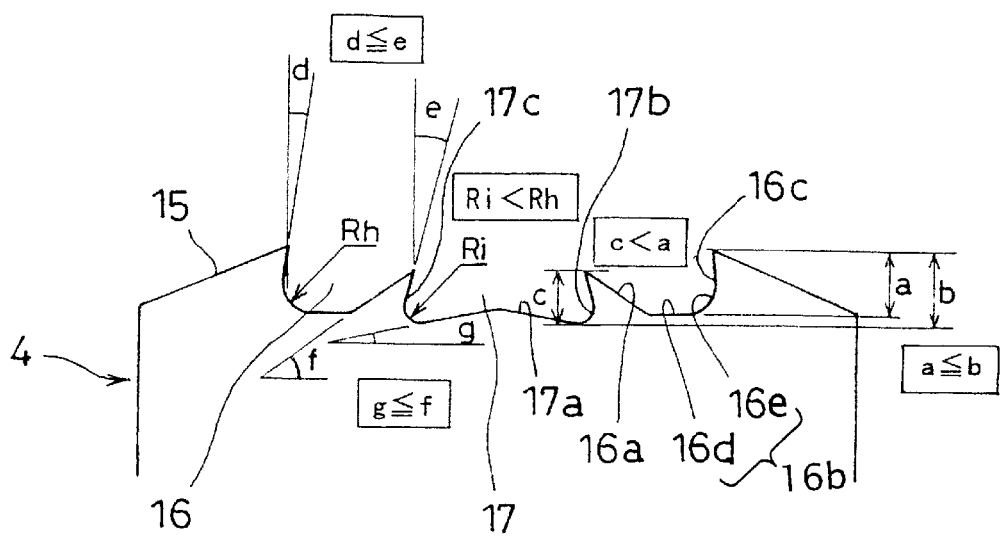
FIG. 3 is a simplified schematic view, similar to FIG. 2(*b*), of the piston illustrated in FIG. 2(*a*) showing the shape and various dimensions of the piston in accordance with the first embodiment of the present invention.

As seen in FIGS. 2(a)–2(c) and 3, an annular surface that defines the outer cavity 16 can be basically divided into a first outer wall surface 16a, a second outer wall surface 16b and a third outer wall surface 16c. The first outer wall surface 16a is arranged relative to an injection angle of the fuel injection valve 11 such that the fuel stream injected from the fuel injection valve 11 strikes the first outer wall surface 16a at a non-perpendicular angle. More specifically, the first outer wall surface 16a slants upwardly such that it becomes higher as it approaches the reciprocation axis 14 of the piston 4 at the center and, as a whole, forms an imaginary conical shape that extends in an upward direction. Accordingly, a momentum of the fuel stream striking the first outer wall surface 16a is softened. Therefore, the fuel stream is prevented from adhering on the first outer wall surface 16a as fuel droplets when it hits the first outer wall surface 16a. Thus, the generation of smoke can be reduced and the increase of unburned hydrocarbons can be prevented. The second outer wall surface 16b extends directly from the radially outward edge of the first outer wall surface 16a. The second outer wall surface 16b includes a flat surface 16d which is substantially perpendicular to the reciprocation axis 14 of the piston 4. Moreover, the second outer wall surface 16b includes an outer curved section 16e with a radius of curvature Rh that curves smoothly toward the third outer wall surface 16c as shown in FIG. 3. In other words, the outer curved section 16e of the second outer wall surface 16b gradually upwardly inclines as it extends in a radial outward direction such that the fuel stream injected against the first outer wall surface 16a is directed toward the third outer wall surface 16c along the second outer wall surface 16b without any abrupt changes in direction. The third outer wall surface 16c extends directly from the second outer wall surface 16b and forms an outer peripheral wall of the entire the outer cavity 16. The third outer wall surface 16c extends in an upward direction that is substantially parallel to the reciprocation axis 14 of the piston 4. As used herein, "substantially parallel" should be construed as including a range of the gradients of ±5° from the parallel. More specifically, in this first embodiment, the third outer wall surface 16c preferably has an outer reentrant section that approaches the reciprocation axis 14 of the piston 4 as the third outer wall surface 16c extends in an upward and radial inward direction toward the fuel injection valve 11 from the second outer wall surface 16b as seen in FIG. 3. The outer reentrant section has a reentrant angle d with respect to the reciprocation axis 14 of the piston 4.

The inner cavity 17 is formed as though by cutting away a center portion of the first outer wall surface 16a. As seen in FIGS. 2(a)–2(c) and 3, an annular surface that defines the inner cavity 17 can be basically divided into a first inner wall surface 17a, a second inner wall surface 17b and a third inner wall surface 17c. The first inner wall surface 17a is arranged relative to an injection angle of the fuel injection valve 11 such that the fuel stream injected from the fuel injection valve 11 strikes the first inner wall surface 17a at a non-perpendicular angle. More specifically, the first outer wall surface 17a preferably slants upwardly such that it becomes higher as it approaches the reciprocation axis 14 of the piston 4 at the center and, as a whole, forms an conical shape that extends upward. Accordingly, a momentum of the fuel stream striking the first inner wall surface 17a is softened. Therefore, the fuel stream is prevented from adhering on the first inner wall surface 17a as fuel droplets when it hits the first inner wall surface 17a. Thus, the generation of smoke can be reduced and the increase of unburned hydrocarbons can be prevent and. The second inner wall surface 17b extends directly from the radially outward edge of the first inner wall surface 17a. The second inner wall surface 17b includes an inner curved section with a radius of curvature Ri that curves smoothly toward the third inner wall surface 17c. In other words, the inner curved section of the second inner wall surface 17b gradually upwardly inclines as it extends in a radial outward direction such that the fuel stream injected against the first inner wall surface 17a is directed toward the third inner wall surface 17c along the second inner wall surface 17b without any abrupt changes in direction. The radius of curvature Ri of the second inner wall surface 17b is preferably arranged to be smaller than the radius of curvature Rh of the second outer wall surface 16b. As a result, the stratified agglomerate fuel-air mixture formed in the inner cavity 17 is relatively compact, and thus, the stratified charge combustion in low load operating regions is stabilized. The third inner wall surface 17c extends directly from the second inner wall surface 17b and forms an outer peripheral wall of the entire the inner cavity 17. The third inner wall surface 17c extends in a direction that is substantially parallel to the reciprocation axis 14 of the piston 4. As used herein, "substantially parallel" should be construed as including a range of the gradients of ±5° from the parallel. More specifically, in this first embodiment, the third inner wall surface 17c preferably has an inner reentrant section that approaches the reciprocation axis 14 of the piston 4 as the third inner wall surface 17c extends in an upward and radial inward direction toward the fuel injection valve 11 from the second inner wall surface 17b as seen in FIG. 3. The inner reentrant section has a reentrant angle e with respect to the reciprocation axis 14 of the piston 4.

As described above, both the third outer wall surface 16c of the outer cavity 16 and the third inner wall surface 17c of the inner cavity 17 have reentrant shapes that become closer to the reciprocation axis 14 of the piston 4 as they extend in the upward direction of the piston 4. Therefore, the fuel-air mixture can be confined inside the outer cavity 16 or the inner cavity 17 effectively after it hits the outer cavity 16 or the inner cavity 17, respectively. Accordingly, the stratified charge combustion can be achieved with good fuel efficiency and few unburned hydrocarbons. Moreover, the reentrant angle e of the inner cavity 17 is preferably arranged to be larger than the reentrant angle d of the outer cavity 16. As a result, fuel spillage from the inner cavity 17 can be sufficiently prevented. Also, stable stratified charge combustion can be accomplished even during idling and other operating regions where the load is extremely low.

Moreover, as seen in FIG. 3, a slant angle g or a second angle formed between the first inner wall surface 17a of the inner cavity 17 and a orthogonal plane of the reciprocation axis 14 of the piston 4 is smaller than a slant angle f or a first angle formed between the first outer wall surface 16a and a orthogonal plane of the reciprocation axis 14 of the piston 4. As a result, the fuel stream is effectively prevented from adhering on the outer cavity 16 as fuel droplets when the fuel stream hits the outer cavity 16 particularly in high-load stratified charge operating regions where the adhering of the fuel droplets increases readily. Also, in stratified high-load operating regions where an amount of the fuel injected per cycle is large and it is easy for the amount of smoke and unburned hydrocarbons to increase, the generation of smoke and the increase of unburned hydrocarbons can be effectively reduced or prevented by using the outer cavity 16. Moreover, as will be demonstrated in the second embodiment presented later, it is also acceptable to set the slant angle g of the inner cavity 17 to zero and make the first inner wall surface 17a a flat surface that is perpendicular to the reciprocation axis 14 of the piston 4.

Furthermore, as seen in FIG. 3, a maximum depth b of the inner cavity 17 as measured from a lowest point of an outer peripheral edge of the outer cavity 16 is preferably larger than a maximum depth a of the outer cavity 16 as measured from the lowest point of the outer peripheral edge of the outer cavity 16. As a result, the fuel stream is prevented from adhering on the inner cavity 17 as fuel droplets as the fuel stream hits the inner cavity 17 when the fuel injection timing is retarded. Moreover, when the maximum depth b is larger than the maximum depth a, the stratified fuel-air agglomeration formed inside the inner cavity 17 is relatively larger than when the maximum depth b is smaller than the maximum depth a. Thus, stable stratified charge combustion can be achieved when the load condition changes from low to medium.

On the other hand, a maximum depth c of the inner cavity 17 as measured from a top edge of the inner cavity 17 is smaller than the maximum depth a (the deepest portion) of the outer cavity 16 as measured from the lowest point of the outer peripheral edge of the outer cavity 16. As a result, the fuel stream can be introduced smoothly into the outer cavity 16 without being blocked by the inner cavity 17 when the injection timing is advanced. Moreover, the fuel-air mixture agglomeration formed in the inner cavity 17 is relatively small, and the fuel-air mixture agglomeration formed in the outer cavity 16 is relatively large. Thus, stable stratified charge combustion can be achieved both in low load regions, where the inner cavity 17 is used, and high load regions, where the outer cavity 16 is used.

In order to achieve excellent stratified charge combustion over a wide range of engine loads, it is also important that the fuel injection be executed such that an appropriate amount of fuel is reliably delivered to and received by the outer cavity 16 or the inner cavity 17. To this end, it is preferred that the injected fuel has a strong penetration or directionality so that the injected fuel is projected in a prescribed direction regardless of the injection timing, i.e., the pressure inside the cylinder. The pressure inside the cylinder changes as the fuel injection timing changes. If the injection angle of the fuel stream changes when the cylinder pressure changes, there will be the risk that the prescribed quantity of fuel cannot be reliably delivered to the outer cavity 16 or the inner cavity 17. It is also preferred that the fuel stream be hollow in order to avoid injecting an excessive quantity of fuel into the inner cavity 17.

Accordingly, in this first embodiment, a multi-hole type injection valve with a multi-hole type injection nozzle is preferably used as the fuel injection valve 11 as shown in FIG. 4($a$). The multi-hole type injection valve has strong directionality or penetration such that there will be little change in the shape of the fuel stream even when the cylinder pressure is rising during the latter half of the compression stroke. In other words, the fuel injection angle does not change depending on the injection back pressure, and thus, the direction in which the fuel stream flows after being injected can be set accurately. Accordingly, a highly homogeneous stratified fuel-air mixture agglomeration can be formed by fuel streams that passed through the outer cavity 16 or the inner cavity 17.

Moreover, the fuel injection valve 11 is configured to inject the fuel stream in a substantially hollow circular cone as shown in FIG. 4($a$). Also, a plurality of portions of the hollow circular cone is discontinuous in a fuel injection direction when the multi-hole type injection valve is used as seen in FIG. 4($b$). Even if the fuel stream injected from the fuel injection valve 11 is shaped substantially like a hollow circular cone from which a plurality of portions have is discontinuous in a fuel injection direction, a fuel stream whose angle does not change due to injection backpressure and which is comparatively homogeneous around its circumference can be obtained. As a result, it is easy to form a homogeneous fuel-air mixture.

Figure 5A:
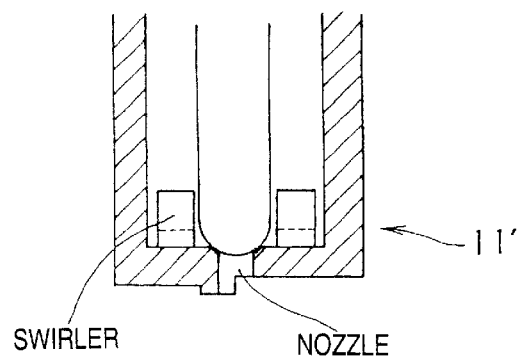
FIG. 5(a) is a schematic cross sectional view of an fuel injection valve having a swirl nozzle that is adapted to be used with the direct fuel injection internal combustion engine illustrated in FIG. 1 in accordance with the first embodiment of the present invention.
Figure 5B:
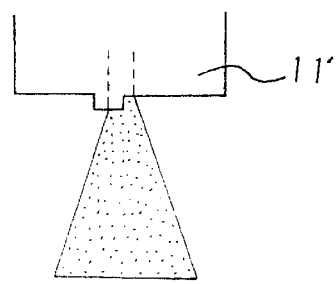
FIG. 5(b) is a schematic side elevational view of the fuel pattern created by the fuel injection valve illustrated in FIG. 5(a) and adapted to be used in the direct fuel injection internal combustion engine illustrated in FIG. 1 in accordance with the first embodiment of the present invention.
Figure 5C:
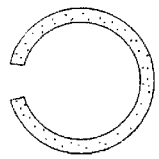
FIG. 5(c) is a schematic view of the fuel pattern created by the fuel stream from the fuel injection valve illustrated in FIGS. 5(a) and 5(b) at the point where the fuel stream hits the top surface of the piston.

Alternatively, the fuel injection valve 11 can also be replaced with a fuel injection valve 11' with a swirl nozzle that injects a swirling fuel stream. As shown in FIG. 5($a$), the swirl nozzle injection valve is usually structured so as to have a step on the injection vent portion of the nozzle so that a fuel stream shaped like that shown in FIG. 5($b$) can be achieved. The fuel stream injected from the swirl nozzle injection valve is also shaped substantially a hollow circular cone in which a portion of the hollow circular cone is discontinuous in a fuel injection direction, as seen in FIGS. 5($b$) and 5($c$). An example of a swirl nozzle injection valve that injects a fuel stream shaped like a hollow circular cone from which a portion has been cut away is disclosed in Japanese Laid-Open Patent Publication No. 2000-329036. When the swirl nozzle injection valve is used, the fuel stream angle does not change due to injection backpressure and a homogeneous fuel-air mixture distribution can be formed by injecting a fuel stream that is more atomized.

Figure 6A:
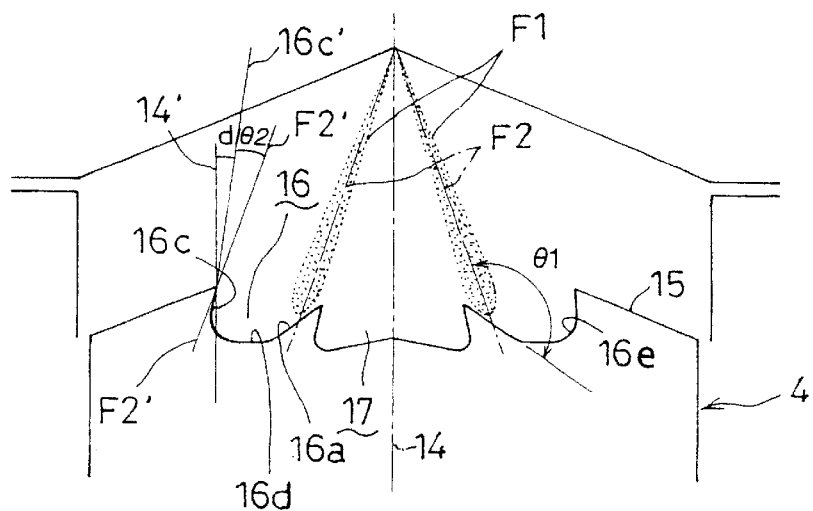
FIGS. 6(a)–(c) are sequential schematic views of the direct fuel injection internal combustion engine illustrated in FIG. 1 that show a shape of the piston and a fuel stream behavior during stratified high-load operating conditions in accordance with the first embodiment of the present invention.
Figure 6B:
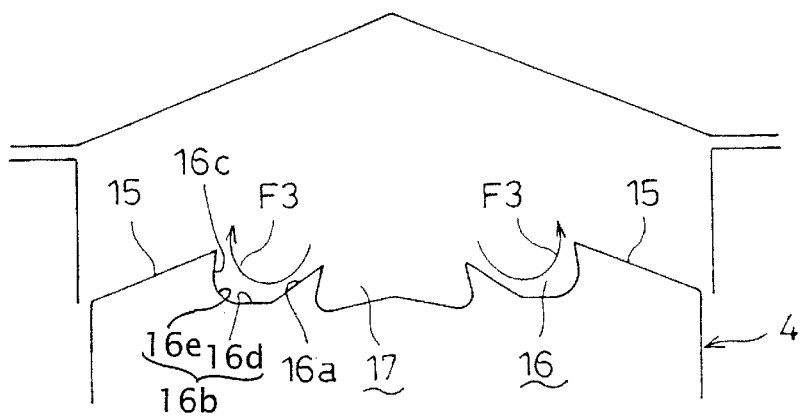
Figure 6C:
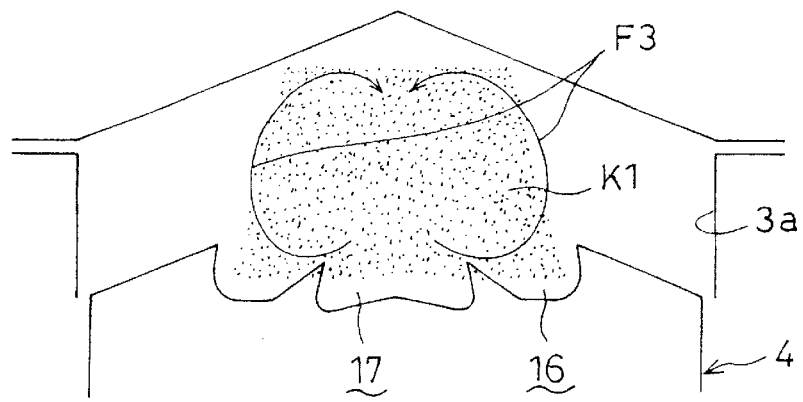

Referring now to FIGS. 6($a$)–6($c$), the fuel stream behavior when the fuel injection timing is retarded so that the fuel stream is injected at the outer cavity 16 will be explained. The fuel stream injected from the fuel injection valve 11 has the shape of a hollow cone that extends in an upward direction and that is centered on the reciprocation axis 14 of the piston 4. As shown in FIG. 6($a$), the fuel stream F1 injected when the fuel injection timing is retarded is set such that it strikes the first outer wall surface 16$a$ at a non-perpendicular angle. More specifically, an obtuse angle θ1 is formed between a center axis or an injection direction F2 of the fuel stream F1 and a portion of the first outer wall surface 16$a$ that is downstream in a fuel stream movement direction (i.e., the portion that is farther outward in the radial direction than the portion where the fuel stream strikes the wall surface). Therefore, the fuel stream F1 strikes the first outer wall surface 16$a$ at a gentle angle. Afterwards, the fuel stream F1 is guided in a favorable manner along the first outer wall surface 16$a$ and radially outward toward the second outer wall surface 16$b$ without scattering in an unpredictable manner. The outer curved section of the second outer wall surface 16$b$ guides the fuel stream favorably such that it follows along the third outer wall surface 16$c$.

The third outer wall surface 16$c$ is slanted at an angle that is close to the injection direction F2 of the fuel stream F1. More specifically, an angle θ2 formed between an extension line 16$c$' of the third outer wall surface 16$c$ and a line F2' which is parallel to the injection direction F2 is substantially small. Moreover, the reentrant angle d of the third outer wall surface 16$c$ with respect to the reciprocation axis 14 of the piston 4 is smaller than the angle formed between the injection direction F2 and the reciprocation axis 14 of the piston 4. Thus, the third outer wall surface 16$c$ guides the fuel stream in a favorable manner toward the direction from which the fuel stream was originally injected. As a result, as shown in FIGS. 6($b$) and 6($c$), a rotating flow F3 is produced which rotates in a swirl-like manner in a vertical orientation aligned along the reciprocation axis 14 of the piston 4. This rotating flow F3 pulls in air from the surrounding areas and forms a fuel-air mixture K1 above the outer cavity 16. As a result, the fuel mixes readily with the air and it is difficult for concentration variations to occur. Accordingly, a homogeneous fuel-air mixture (agglomeration) K1 can be formed inside and above the outer cavity 16. As a result, the discharge of smoke is suppressed and prevented and stable combustion can be obtained even when exhaust gas is recirculated (EGR) in large quantities. Moreover, an excellent stratified charge combustion that releases few NOx emissions can be achieved. Furthermore, when the outer cavity 16, which has a larger volume than the inner cavity 17, is used to form the stratified fuel-air mixture agglomeration, stable stratified combustion can be achieved when the fuel injection timing is retarded or when the engine operating condition is in high load operating regions where the load is relatively large.

Figure 7A:
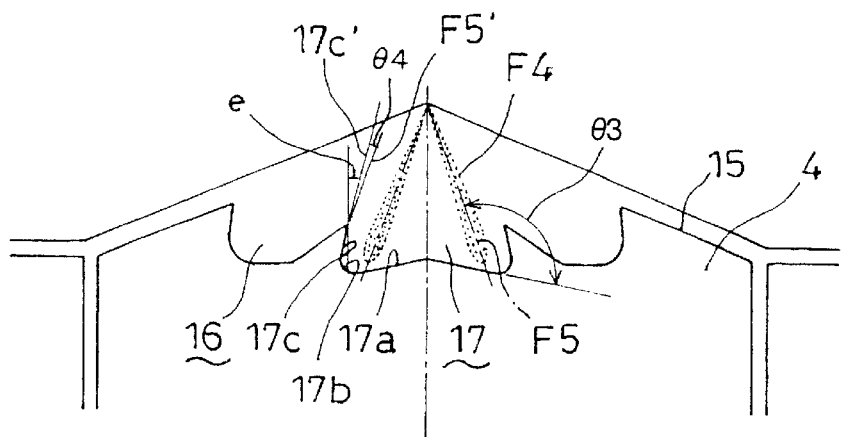
FIGS. 7(a)–(c) are sequential schematic views of the direct fuel injection internal combustion engine illustrated in FIG. 1 that show the shape of the piston and the fuel stream behavior during stratified low-load operating conditions in accordance with the first embodiment of the present invention.
Figure 7B:
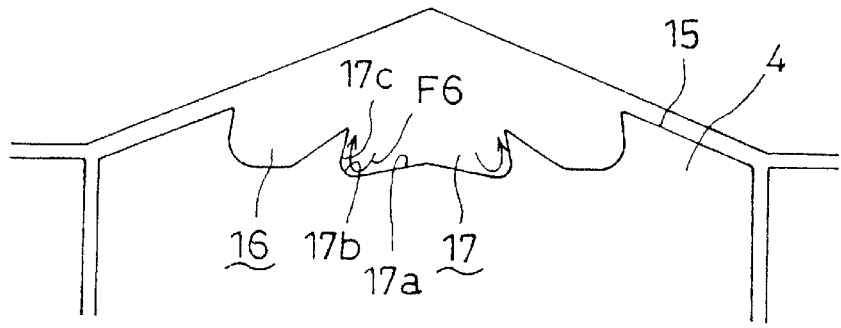
Figure 7C:
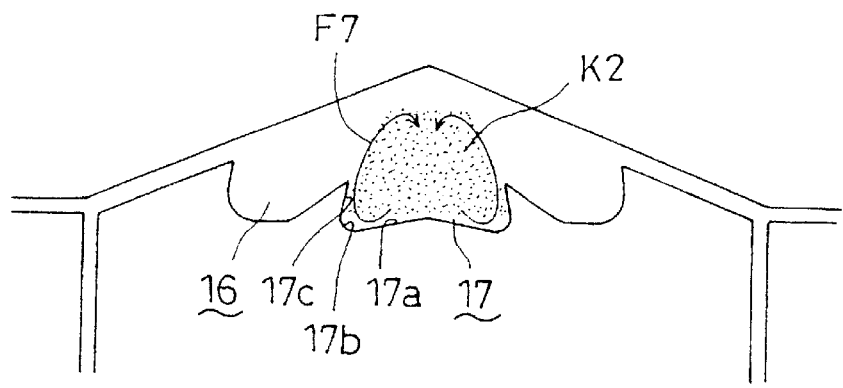

Referring now to FIGS. 7(a)–7(c), the fuel stream behavior when the fuel injection timing is advanced so that the fuel stream is injected at the outer cavity will be explained. As shown in FIG. 7(a), the fuel stream F4 injected when the fuel injection timing is advanced is set such that it strikes the first inner wall surface 17a at a non-perpendicular angle. More specifically, an obtuse angle θ3 is formed between a center axis or an injection direction F5 of the fuel stream F4 and a portion of the first inner wall surface 17a that is downstream in the fuel stream movement direction (i.e., the portion that is farther outward in the radial direction than the portion where the fuel stream strikes the wall surface). Therefore, the fuel stream F4 strikes the first inner wall surface 17a at a gentle angle. Afterwards, the fuel stream F4 is guided in a favorable manner along the first inner wall surface 17a and radially outward toward the second inner wall surface 17b without scattering in an unpredictable manner. The smooth curvature of the second inner wall surface 17b guides the fuel stream favorably such that it follows along the third inner wall surface 17c.

Figure 4A:
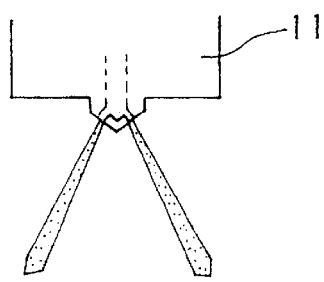
FIG. 4(*a*) is a schematic view of an fuel injection valve adapted to the direct fuel injection internal combustion engine illustrated in FIG. 1 that utilizes a multi hole nozzle to form a hollow cone of fuel from a plurality of fuel streams in accordance with the first embodiment of the present invention.
FIG. 4(b) is a schematic view of the fuel pattern created by the fuel streams from the fuel injection valve illustrated in FIG. 4(b) at the point where the fuel streams hit the top surface of the piston in according with the first embodiment of the present invention.
Figure 4B:
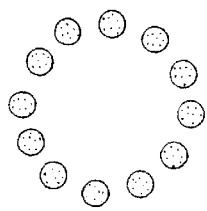

The third inner wall surface 17c is slanted at an angle that is close to the injection direction F5. More specifically, an angle θ4 formed between an extension line 17c' of the third inner wall surface 17c and a line F5' which is parallel to the injection direction F5 is substantially small. Moreover, the reentrant angle e of the third inner wall surface 17c with respect to the reciprocation axis 14 of the piston 4 is smaller than the angle formed between the injection direction F5 and the reciprocation axis 14 of the piston 4. Therefore, the third inner wall surface 17c guides the fuel stream in a favorable manner toward the direction from which it was originally injected. As a result, as shown in FIGS. 4(b) and 4(c), a rotating flow F6 is produced which rotates in a swirl-like manner in a vertical orientation aligned along the reciprocation axis 14 of the piston 4. This rotating flow F6 pulls in air from the surrounding areas and forms a fuel-air mixture K2 above the inner cavity 17. As a result, the fuel mixes readily with the air and it is difficult for concentration variations to occur. Accordingly, a homogeneous fuel-air mixture (agglomeration) K2 can be formed inside and above the inner cavity 17. As a result, the discharge of smoke is suppressed and prevented and stable combustion can be obtained even when exhaust gas is recirculated (EGR) in large quantities. Moreover, an excellent stratified charge combustion that releases few NOx emissions can be achieved. Furthermore, the agglomerate fuel-air mixture K2 is quite smaller than the agglomerate fuel-air mixture K1 formed using the outer cavity 16 shown in FIG. 6(c) because the radius of curvature Ri of the inner curved section is arranged to be smaller than the radius of curvature Rh of the outer curved section. As a result, when the inner cavity 17, which has a smaller volume than the outer cavity 16, is used to form the stratified fuel-air mixture agglomeration, the stratified charge combustion in low load operating regions where the load is comparatively small can be stabilized.

Thus, in the stratified charge combustion, when the fuel stream is directed to the inner cavity 17, the fuel injection timing is adjusted to more advanced timing during a compression stroke. On the other hand, in the stratified charge combustion, when the fuel stream is directed to the outer cavity 16, the fuel injection timing is adjusted to more retarded timing during a compression stroke. As described above, the start timing of the fuel injection is controlled by the engine control unit 13 which is operatively coupled to the fuel injection valve 11. More specifically, the engine control unit 13 is configured to control start timing of the fuel injection valve 11 based on an engine operating condition. For example, the control unit 13 is configured to adjust the start timing of the fuel injection to be advanced more in a cycle upon determination of a high-load operating condition so that the fuel stream is injected to the outer cavity 16 to form a relatively large stratified fuel-air mixture agglomeration. Similarly, the engine control unit 13 is configured to adjust the start timing of the fuel injection to be retarded more in a cycle upon determination of a low-load operating condition so that the fuel stream is injected to the inner cavity 17 to form a relatively compact stratified fuel-air mixture agglomeration. When the injection timing in the low load operating region is retarded in comparison with the high load operating region, the outer cavity 16 and the inner cavity 17 can be utilized in accordance with the load even if the injection directions F2 and F4 are the same for both the low load operating region and the high load operating region because the fuel stream will strike the first outer wall surface 16a when the engine is operating in the high load region and the first inner wall surface 17a when the engine is operating in the low load region.

Figure 8:
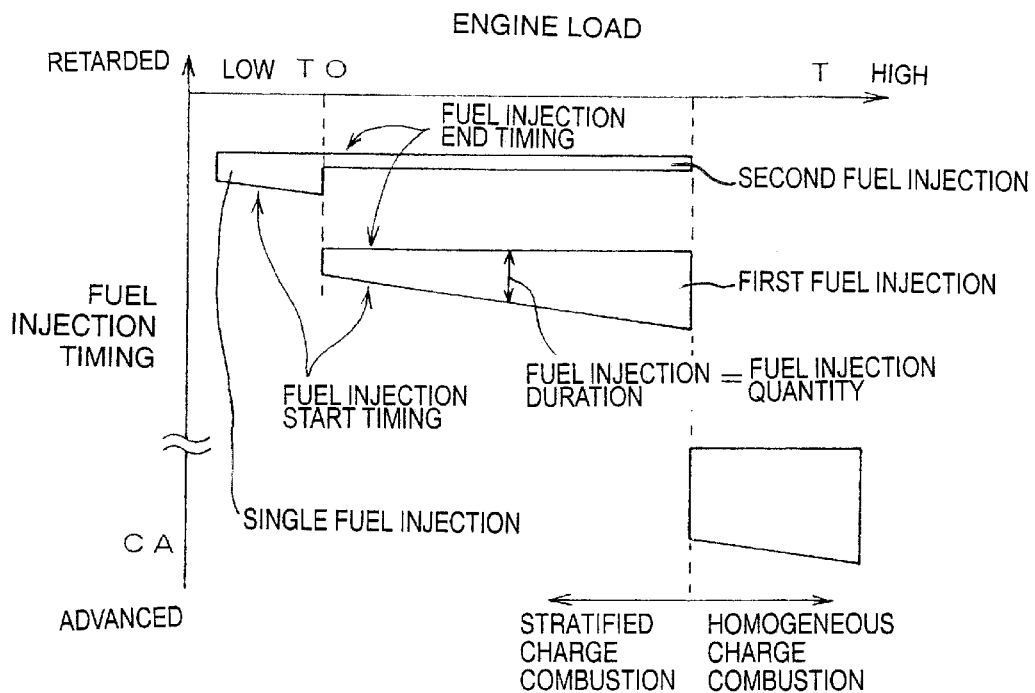
FIG. 8 is a diagram that illustrates how the fuel injection timing and fuel injection quantity are controlled with respect to the engine load in accordance with the first embodiment of the present invention.

Moreover, the engine control unit 13 is preferably further configured to control frequency of the fuel injection during a cycle. More specifically, the engine control unit 13 is preferably configured to execute a plurality of fuel injections during each compression stroke when the engine operating condition is with in a prescribed operating region. More specifically, in this first embodiment, the engine control unit 13 is preferably configured to execute first and second fuel injections during each compression stroke when the engine operating condition is in a prescribed operating region such that stratified charge combustion occurs. As seen in FIG. 8, the fuel injection timing and fuel injection amount is controlled by the engine control unit 13 based on the engine load. When the engine load is above a prescribed load T0, the first and second fuel injections are executed during the compression stroke. In this region, the first fuel injection is executed at such an injection timing that the fuel enters the outer cavity 16 and the second fuel injection is executed at such an injection timing that the fuel enters the inner cavity 17. As a result, when the total fuel injection quantity per cycle is large, a relatively large stratified fuel-air mixture agglomeration is obtained.

Moreover, as seen in FIG. 8, when the engine load is below a prescribed load T0, a single fuel injection is executed during each compression stroke. In this region, the fuel injection is timed such that the fuel stream is injected to the inner cavity 17. As a result, when the total amount of the fuel injected is relatively small, a relatively compact stratified fuel-air mixture agglomeration is obtained. Moreover, the amount of fuel injected in the single fuel injection during each compression stroke is increased and decreased by adjusting the timing at which the fuel injection starts to extend the duration of the single fuel injection. In other words, the total amount of fuel injected during the single fuel injection is increased as the load increases by advancing the start timing of the fuel injection. Accordingly, the size of the fuel-air mixture formed by the fuel that passed through the inner cavity 17 increases as the fuel injection amount increases. Thus, the occurrence of an excessively rich region can be suppressed.

If the duration of the single fuel injection is steadily extended as the engine load increases, eventually a point will be reached where the fuel stream can no longer be received by the inner cavity 17. Before this point is reached, the engine control unit 13 is configured to shift from executing the single fuel injection during a compression stroke to executing a divided fuel injection comprising two separate fuel injections, the first and second fuel injections, during a compression stroke.

When the divided fuel injection is executed, the second fuel injection is timed such that it starts later (at a more retarded timing) and injects a smaller amount of fuel than the amount of the fuel injected during the single fuel injection. The timing at which the fuel injection ends when the single fuel injection is executed is substantially the same as the timing at which the second fuel injection ends when the divided fuel injection is executed. On the other hand, the start timing used for the second fuel injection when executing the divided fuel injection is more retarded than the most advanced fuel injection start timing used in cases where the single fuel injection is executed during the compression stroke. As a result, the fuel injection quantity can be reduced and a fuel-air mixture that can be spark ignited reliably can be formed near the spark plug 12.

While the divided fuel injections are being executed, the fuel injection quantity is increased in response to increase in engine load by increasing the quantity of fuel injected during the first fuel injection. As a result, the concentration of the fuel-air mixture (the fuel-air mixture in the vicinity of the spark plug 12) formed by the fuel that passes through the inner cavity 17 is kept substantially constant regardless of any increases or decreases in the total fuel injection quantity. Thus, excellent spark ignition performance is obtained on a consistent basis. The amount of fuel injected during the first fuel injection is increased by advancing the start timing of the first fuel injection while keeping the end timing of the first fuel injection substantially the same. As a result, the size of the fuel-air mixture formed by the fuel that passes through the outer cavity 16 increases as the fuel injection amount increases. Thus, the occurrence of an excessively rich region can be suppressed. Furthermore, the end timing of the first fuel injection is more advanced than the most advanced fuel injection start timing used in cases where the single fuel injection is executed during the compression stroke. As a result, the fuel is prevented from striking the border portion between the inner cavity 17 and the outer cavity 16 and fuel-air mixture formation utilizing the two cavities 16 and 17 can be accomplished in a favorable manner.

Figure 9A:
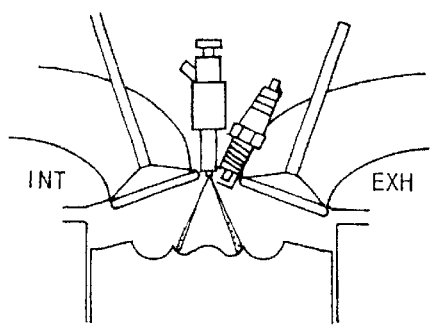
FIGS. 9(a)–(c) are sequential schematic views that show the fuel behavior when only a single fuel injection is executed per cycle during stratified low-load operating conditions.
Figure 9B:
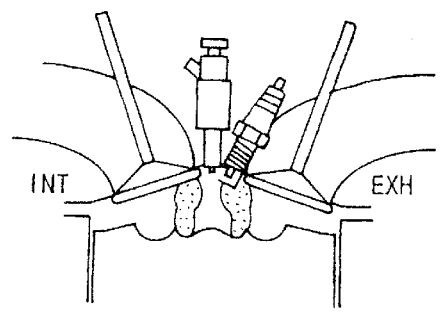
Figure 9C:
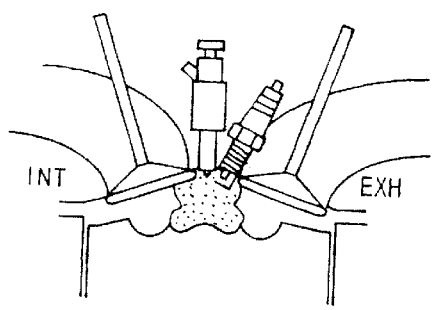

FIGS. 9(a)–9(c) show the fuel behavior during stratified low-load operating conditions when the single fuel injection is executed during the compression stroke when the engine load is lower than the prescribed load T0.

The fuel injection timing under stratified low-load operating conditions is set such that the fuel injected from the fuel injection valve 11 is received by the inner cavity 17 as seen in FIG. 9(a). The penetrating force of the fuel stream causes the fuel stream to advance along the inner cavity 17 and head upward into the upper space of the combustion chamber 1 as seen in FIG. 9(b). The piston 4 causes the fuel stream to change its direction of advancement and the fuel stream rotates in a swirling manner while pulling in air from the surrounding areas to form a homogeneous fuel-air mixture in the space above the inner cavity 17 as seen in FIG. 9(c). Since the single fuel injection is directed toward the inner cavity 17, the fuel-air mixture agglomeration that is formed is relatively compact and homogeneous fuel-air mixture is formed near the center of the combustion chamber 1.

FIGS. 10(a)–10(d) show the fuel behavior during stratified high-load operating conditions when the first and second fuel injections are executed during a compression stroke when the engine load is higher than the prescribed load T0.

Figure 10A:
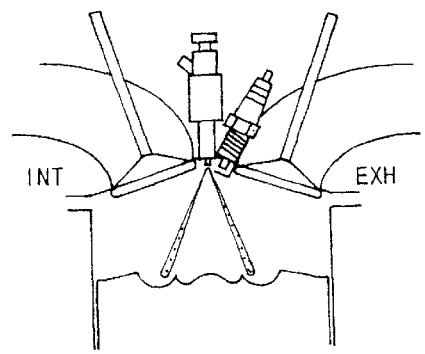
FIGS. 10(a)–(d) are sequential schematic views that show the fuel behavior when a pair of fuel injections are executed per cycle during stratified charge high-load operating conditions.
Figure 10B:
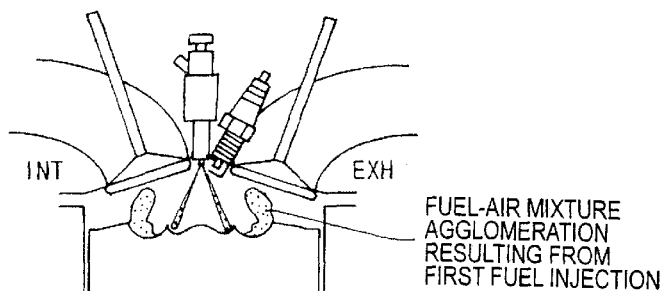

First, as seen in FIG. 10(a), the first fuel injection is executed at a point in time roughly midway through the compression stroke such that the fuel is directed toward the outer cavity 16. The fuel stream resulting from the first fuel injection strikes against the outer cavity 16 and the penetrating force of the fuel stream causes it to following along the outer cavity 16 and head toward the upper space of the combustion chamber. As it rises, the fuel stream pulls in air from the surrounding areas and forms a homogeneous fuel-air mixture as seen in FIG. 10(b). The size of the fuel-air mixture formed by the first fuel injection depends on the size of the outer cavity 16, but the fuel-air mixture agglomeration is relatively large and it is a substantially donut-shape which is lean in the central area of the combustion chamber 1.

Figure 10C:
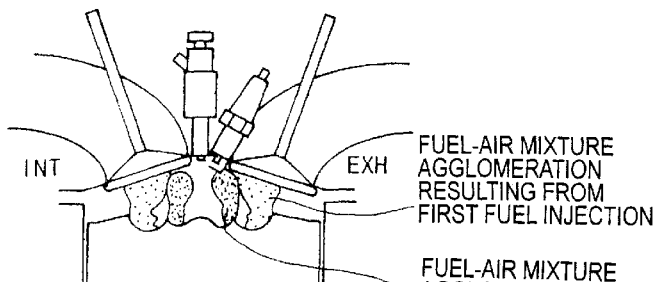
Figure 10D:
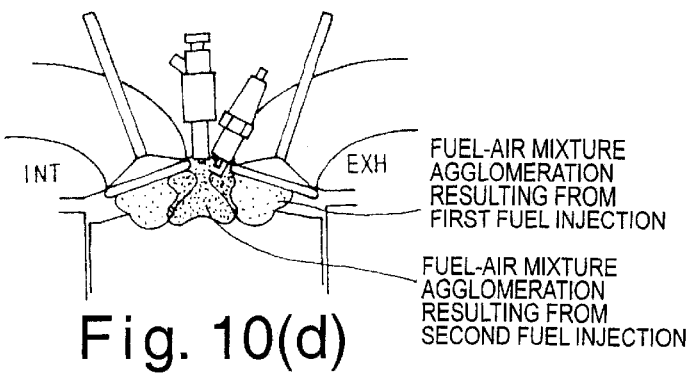

After the first fuel injection, the second fuel injection is executed such that the fuel is directed toward the inner cavity 17. The second fuel injection is timed to occur in the latter half of the compression stroke close to top dead center. Thus, the second fuel injection is timed such that the injected fuel will be reliably received in the inner cavity 17 even if the injection angle is the same as for the first fuel injection. The second fuel injection goes through a fuel-air mixture formation process similar to that experienced by the single fuel injection executed under stratified low-load conditions to form a relatively compact, agglomerate, homogeneous fuel-air mixture as seen in FIG. 10(c). Accordingly, the substantially donut shaped fuel-air mixture agglomeration formed by the first fuel injection and the compact fuel-air mixture agglomeration formed by the second fuel injection are formed as seen in FIG. 10(d). As a result, a relatively large stratified fuel-air mixture agglomeration can be obtained and the occurrence of a lean fuel-air mixture region in the center of the fuel-air mixture agglomeration (i.e., a donut-shaped fuel-air mixture agglomeration) can be avoided. Thus, reliable spark ignition can be accomplished when the engine operating condition is within the prescribed region. Furthermore, the homogeneous fuel-air mixture enables performance combustion can be achieved without damaging the exhaust and combustion performance.

Moreover, the maximum amount of fuel injected during the second fuel injection is less than the maximum amount of fuel injected when the single fuel injection is executed during the compression stroke, as described above. Therefore, the occurrence of excessively rich region resulting from the overlapping of the fuel-air mixture formed by the fuel that passed through the inner cavity 17 and the fuel-air mixture formed by the fuel that passed through the outer cavity 16 can be effectively suppressed. More specifically, the fuel-air mixture formed by the fuel that passed through the outer cavity 16 is donut-shaped, but it diffuses both inward and outward over time. As a result, a portion of the fuel-air mixture diffuses into the region where the fuel-air mixture formed by the fuel that passed through the inner cavity 17 is to be formed. Under these conditions, if the second fuel injection is executed with an amount of fuel that is the same as the maximum amount of the fuel injected when the single fuel injection is executed during the compression stroke, then the fuel-air mixture near the spark plug 12 will become excessively rich. Therefore, the production of an excessively rich region is suppressed by making the quantity of fuel injected during the second fuel injection less than the maximum amount of fuel injected when the single fuel injection is executed during the compression stroke.

When the engine operating condition is in full load conditions (e.g., when the maximum amount of fuel is injected for the maximum amount of air to obtain maximum torque) or other high-output operation, fuel injection is executed during the intake stroke as shown in FIG. 8. Accordingly, sufficient mixing time is provided such that the fuel-air mixture distribution inside the cylinder becomes homogeneous and the homogeneous combustion is conducted.

In this first embodiment, the fuel injection timing is advanced or retarded to control which of the outer cavity 16 and the inner cavity 17 the fuel stream is injected to. Alternatively, it will be apparent to those skilled in the art from this disclosure that the fuel injection valve 11 of FIG. 4(a) is a variable injection valve in which the injection direction can be varied to control the fuel injection to the designated cavity. For example, the fuel injection valve 11 is constructed as disclosed in Japanese Laid-Open Patent Publication No. 2000-303936. When the injection direction of the fuel injection valve 11 is variable, it is preferred that injection direction be controlled such that the fuel is directed toward the outer cavity 16, which is close to the cylinder 3a, when operating in the stratified high-load region. Moreover, the fuel injection direction is preferably controlled such that the fuel is directed toward the inner cavity 17, which is close to the reciprocation axis 14 of the piston 4, when operating in the stratified low-load region. More specifically, the angle of the injection direction with respect to the reciprocation axis 14 of the piston 4 is made larger when in the stratified high-load region and smaller when in the stratified low-load region. As a result, a comparatively small fuel-air mixture agglomeration is formed by the inner cavity 17 during low-load operating conditions and a comparatively large fuel-air mixture is formed by the outer cavity 16 during high-load operating conditions and stable stratified charge combustion can be achieved under both low loads and high loads. Of course, it will be apparent to those skilled in the art from this disclosure that the combination of the fuel injection angle and fuel injection timing can be used to inject the fuel stream into the outer cavity 16 or the inner cavity 17 when the fuel injection valve in which the injection direction is variable.

Second Embodiment

Figure 11:
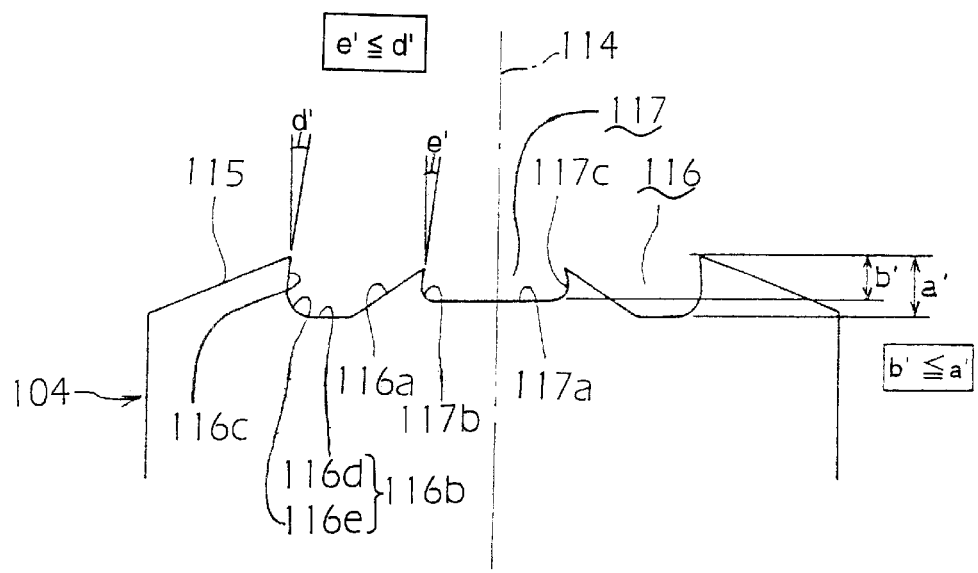
FIG. 11 is a simplified schematic view, similar to FIG. 2(b), of a piston adapted to be used in a direct fuel injection internal combustion engine in accordance with a second embodiment of the present invention showing the shape and various dimensions of the piston.

Referring now to FIG. 11, a direct fuel injection internal combustion engine in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the direct fuel injection internal combustion engine of the second embodiment of the present invention differs from the first embodiment in that a modified piston 104 is used. In particular, the piston 104 has been modified such that shapes and dimensional relationship of an outer cavity 116 and an inner cavity 117 have been designed so as to increase stability during idling and other low-load stratified operating regions where the load is extremely low.

As seen in FIG. 11, a first inner wall surface 117a of the inner cavity 117 is a flat surface that is perpendicular to a reciprocation axis 114 of the piston 104. As a result, combustion stability can be maintained in extremely-low-load stratified operating regions, e.g., idling, for which smoke and unburned hydrocarbon emissions are inherently small. At the same time, manufacturability can be improved and cooling losses can be reduced. Moreover, a maximum depth b' of the inner cavity 117 as measured from a lowest point of an outer peripheral edge of the outer cavity 116 is smaller than a maximum depth a' of the outer cavity 116 as measured from the lowest point of the outer peripheral edge of the outer cavity 116. As a result, the stratified fuel-air mixture agglomeration formed in the inner cavity 117 is relatively compact, and again, stable stratified charge combustion can be achieved during idling and other times when the load is extremely low. Also, a reentrant angle e' of a third inner wall surface 117' with respect to the reciprocation axis 114 of the piston 104 is smaller than or equal to a reentrant angle d' of a third outer wall surface 116c with respect to the reciprocation axis 114 of the piston 104. Therefore, the fuel-air mixture inside the inner cavity 117 is prevented from becoming excessively concentrated and the generation of smoke and unburned hydrocarbons can be suppressed and prevented. Moreover, the agglomerate fuel-air mixture produced by the inner cavity 117 is smaller in the second embodiment than the agglomerate fuel-air mixture produced by the inner cavity 17 in the first embodiment. Accordingly, the fuel-air mixture inside the inner cavity 117 is prevented from becoming excessively concentrated when the load condition changes from low to medium. Thus, the generation of smoke can be suppressed and unburned hydrocarbons can be prevented in an effective manner.

Alternative Shapes of Piston, Outer and Inner Cavities

Figure 12:
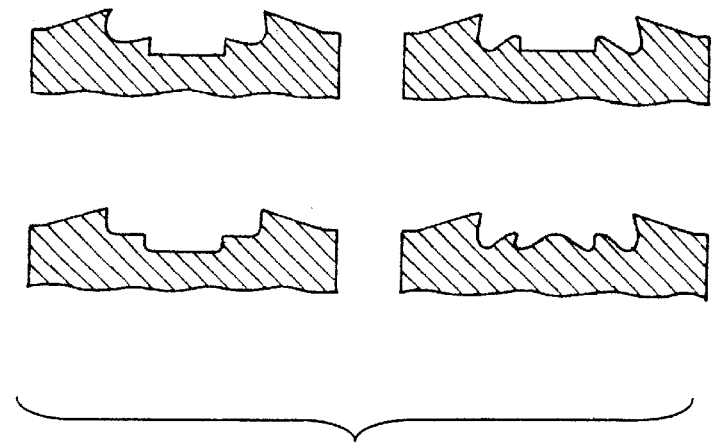
FIG. 12 illustrates several simplified schematic views of pistons with alternative cavity shapes that can be adapted to a direct fuel injection internal combustion engine in accordance with the present invention.

The various shapes shown in FIG. 12 are also feasible shapes for the piston, the outer cavity and the inner cavity. Generally, the fuel can be agglomerated to a higher degree by slanting the lateral walls of the cavities inward from the perpendicular. However, slanting the lateral walls of the cavities also entails the drawback that the degree of homogeneity may decline during homogeneous combustion or the S/V ratio may become poor. It is therefore necessary to optimize the cavity shape in accordance with the engine specifications.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus-function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2002-162358 and 2002-195608. The entire disclosure of Japanese Patent Application Nos. 2002-162358 and 2002-195608 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection internal combustion engine, comprising:

a combustion chamber having a piston movably mounted therein along a reciprocation axis;

a fuel injection valve arranged adjacent the reciprocation axis of the piston to inject a fuel stream directly into the combustion chamber; and a spark plug arranged adjacent the reciprocation axis of the piston to ignite a fuel-air mixture inside the combustion chamber, the piston including an outer cavity located in a top surface of the piston and being substantially axially symmetrical about the reciprocation axis of the piston, and an inner cavity located in the outer cavity and being substantially axially symmetrical about the reciprocation axis of the piston.

2. The direct fuel injection internal combustion engine as recited in claim 1, wherein the outer cavity has a first outer wall surface arranged relative to an injection angle of the fuel injection valve such that the fuel stream injected from the fuel injection valve strikes the first outer wall surface at a non-perpendicular angle, a second outer wall surface extending directly from a radially outward edge of the first outer wall surface, and a third outer wall surface extending directly from the second outer wall surface, the second outer wall surface including an outer curved section that curves toward the third outer wall surface, and the third outer wall surface extending in an upward direction that is substantially parallel to the reciprocation axis of the piston.

3. The direct fuel injection internal combustion engine as recited in claim 2, wherein the inner cavity has a first inner wall surface arranged relative to the injection angle of the fuel injection valve such that the fuel stream injected from the fuel injection valve strikes the first inner wall surface at a non-perpendicular angle, a second inner wall surface extending directly from a radially outward edge of the first inner wall surface, and a third inner wall surface extending directly from the second inner wall surface, the second inner wall surface including an inner curved section that curves toward the third inner wall surface, and the third inner wall surface extending in the upward direction that is substantially parallel to the reciprocation axis of the piston.

4. The direct fuel injection internal combustion engine as recited in claim 3, wherein the inner curved section has a radius of curvature that is smaller than a radius of curvature of the outer curved section.

5. The direct fuel injection internal combustion engine as recited in claim 2, wherein the third outer wall surface has an outer reentrant section that approaches the reciprocation axis of the piston as the third outer wall surface extends in the upward direction and a radial inward direction toward the fuel injection valve from the second outer wall surface.

6. The direct injection internal combustion engine as recited in claim 3, wherein the third inner wall surface has an inner reentrant section that approaches the reciprocation axis of the piston as the third inner wall surface extends in the upward direction and the radial inward direction toward the fuel injection valve from the second inner wall surface.

7. The direct fuel injection internal combustion engine as recited in claim 3, wherein the third inner and outer wall surfaces are arranged relative to the reciprocation axis of the piston such that the third inner wall surface forms a larger angle with respect to the reciprocation axis of the piston than the third outer wall surface.

8. The direct fuel injection internal combustion engine as recited in claim 3, wherein the third inner and outer wall surfaces are arranged relative to the reciprocation axis of the piston such that the third inner wall surface forms a smaller angle with respect to the reciprocation axis of the piston than the third outer wall surface.

9. The direct fuel injection internal combustion engine as recited in claim 1, wherein the inner cavity has a maximum depth as measured from a lowest point of an outer peripheral edge of the outer cavity that is smaller than a maximum depth of the outer cavity as measured from the lowest point of the outer peripheral edge of the outer cavity with respect to a top to bottom direction of the piston.

10. The direct fuel injection internal combustion engine as recited in claim 1, wherein the inner cavity has a maximum depth as measured from a lowest point of an outer peripheral edge of the outer cavity that is larger than a maximum depth of the outer cavity as measured from the lowest point of the outer peripheral edge of the outer cavity with respect to a top to bottom direction of the piston.

11. The direct fuel injection internal combustion engine as recited in claim 1, wherein the inner cavity has a maximum depth as measured from a top edge of the inner cavity that is smaller than a maximum depth of the outer cavity as measured from a lowest point of an outer peripheral edge of the outer cavity.

12. The direct fuel injection internal combustion engine as recited in claim 3, wherein the first outer wall surface slants at a first angle with respect to an orthogonal plane of the reciprocation axis of the piston such that the first outer wall surface extends in the upward direction and a radial inward direction toward the fuel injection valve as the first outer wall surface approaches the reciprocation axis of the piston.

13. The direct fuel injection internal combustion engine as recited in claim 12, wherein the first inner wall surface slants at a second angle with respect to the orthogonal plane of the reciprocation axis of the piston such that the first inner wall surface extends in the upward direction and the radial inward direction toward the fuel injection valve as the first inner wall surface approaches the reciprocation axis of the piston.

14. The direct fuel injection internal combustion engine as recited in claim 13, wherein the second angle of the first inner wall surface is smaller than the first angle of the first outer wall surface.

15. The direct fuel injection internal combustion engine as recited in claim 3, wherein the first inner and outer wall surfaces are arranged relative to an orthogonal plane of the reciprocation axis of the piston such that the first inner wall surface forms a smaller angle with respect to the orthogonal plane than the first outer wall surface.

16. The direct fuel injection internal combustion engine as recited in claim 3, wherein the first inner wall surface is a flat surface that is substantially perpendicular to the reciprocation axis of the piston.

17. The direct fuel injection internal combustion engine as recited in claim 1, wherein the fuel injection valve is configured to inject the fuel stream in a substantially hollow circular cone in which at least a portion of the hollow circular cone is discontinuous in a fuel injection direction.

18. The direct fuel injection internal combustion engine as recited in claim 17, wherein the fuel injection valve includes a multi-hole injection nozzle.

19. The direct fuel injection internal combustion engine as recited in claim 17, wherein the fuel injection valve includes a swirl nozzle that injects a swirling fuel stream.

20. The direct fuel injection internal combustion engine as recited in claim 1, further comprising a control unit configured to operate the fuel injection valve to vary at least one of frequency and start timings of fuel injection based on an engine operating condition.

21. The direct fuel injection internal combustion engine as recited in claim 20, wherein the control unit is further configured to adjust the start timing of the fuel injection to be advanced more in a cycle upon determination of a high-load operating condition than upon determination of a low-load operating condition when stratified charge combustion occurs.

22. The direct fuel injection internal combustion engine as recited in claim 20, wherein the control unit is further configured to execute a plurality of fuel injections during a compression stroke of a cycle when the engine operating condition is within a prescribed operating region such that the fuel injection valve injects the fuel stream into the inner cavity during at least one of the plurality of fuel injections, and injects the fuel stream into the outer cavity during at least one of the plurality of fuel injections.

23. The direct fuel injection internal combustion engine as recited in claim 22, wherein the control unit is further configured to determine the engine operating condition based on an engine load, and execute first and second fuel injections of the plurality of fuel injections during the compression stroke of the cycle when the engine load is higher than a prescribed load with the first fuel injection occurring such that the fuel injection valve injects the fuel stream into the outer cavity, and the second fuel injection occurring such that the fuel injection valve injects the fuel stream into the inner cavity.

24. The direct fuel injection internal combustion engine as recited in claim 23, wherein the control unit is further configured to operate the fuel injection valve to increase and decrease a total fuel amount of fuel being injected during the compression stroke by varying a maximum amount of fuel injected during the first fuel injection, while maintaining constant an amount of fuel injected during the second fuel injection.

25. The direct fuel injection internal combustion engine as recited in claim 24, wherein the maximum amount of the fuel injected during the first fuel injection is varied by adjusting the start timing to vary duration of the first fuel injection.

26. The direct fuel injection internal combustion engine as recited in claim 23, wherein the control unit is further configured to execute only a single fuel injection during a compression stroke of a cycle such that the fuel injection valve injects the fuel stream into the inner cavity when the engine load is lower than the prescribed load.

27. The direct fuel injection internal combustion engine as recited in claim 26, wherein the control unit is further configured such that a maximum amount of fuel injected during the second fuel injection is less than a maximum amount of fuel injected during the single fuel injection.

28. The direct fuel injection internal combustion engine as recited in claim 26, wherein the control unit is further configured to operate the fuel injection valve to increase and decrease a total fuel amount of fuel being injected during the single fuel injection by adjusting the start timing of the single fuel injection to vary duration of the single fuel injection.

29. The direct fuel injection internal combustion engine as recited in claim 28, wherein the control unit is further configured to adjust the start timing of the second fuel injection to be more retarded than a most advanced start timing of the single fuel injection.

30. The direct fuel injection internal combustion engine as recited in claim 28, wherein the control unit is further configured to set an end timing of the first fuel injection during the compression stroke to be more advanced than a most advanced start timing of the fuel injection of the single fuel injection.

31. The direct fuel injection internal combustion engine as recited in claim 1, wherein the inner cavity has a maximum diameter that is less than ½ of a bore diameter of a cylinder; and the outer cavity a maximum diameter that is equal to or less than ¾ of the bore diameter of the cylinder.

32. The direct fuel injection internal combustion engine as recited in claim 1, further comprising a control unit operatively coupled to the fuel injection valve and configured to set an angle of an injection direction of the fuel stream injected from the fuel injection valve with respect to the reciprocation axis of the piston to be larger when an engine operating condition is in a low-load condition than when the engine operating condition is in a high-load condition.

33. The direct fuel injection internal combustion engine as recited in claim 1, further comprising
- a control unit operatively coupled to the fuel injection valve and configured to set an angle of an injection direction of the fuel stream injected from the fuel injection valve such that the fuel stream points toward the outer cavity when an engine operating condition is in a low-load condition and toward the inner cavity when the engine operating condition is in a low-load operating condition.

34. A direct fuel injection internal combustion engine comprising:
- means for forming a combustion chamber having a piston movably mounted therein, the piston including an outer cavity located in a top surface of the piston and being substantially axially symmetrical about a reciprocation axis of the piston and an inner cavity located in the outer cavity being substantially axially symmetrical about a reciprocation axis of the piston;
- igniting means for igniting a fuel-air mixture in the combustion chamber;
- injection means for injecting fuel directly into the combustion chamber against one of the outer cavity and the inner cavity; and
- control means for controlling the injection means to execute at least one fuel injection during a compression stroke when an engine operating condition is within a prescribed operating region such that the fuel stream is injected into only one of the inner and outer cavities during the at least one fuel injection.

35. A method of operating a direct fuel injection internal combustion engine comprising:
- reciprocating a piston in a cylinder, the piston including an outer cavity located in a top surface of the piston and being substantially axially symmetrical about a reciprocation axis of the piston and an inner cavity located in the outer cavity being substantially axially symmetrical about a reciprocation axis of the piston;
- selectively injecting at least one fuel stream directly into only one of the inner and outer cavities at a time during a compression stroke when an engine operating condition is within a prescribed operating region; and
- igniting a fuel-air mixture formed above at least one of the inner and outer cavities.

* * * * *